United States Patent

Moddel

[11] Patent Number: 5,952,988
[45] Date of Patent: Sep. 14, 1999

[54] DISPLAY HAVING GRADIENT RESPONSE PIXELS

[75] Inventor: Garret R. Moddel, Boulder, Colo.

[73] Assignee: University Technology Corp, Boulder, Colo.

[21] Appl. No.: 08/748,136

[22] Filed: Nov. 12, 1996

[51] Int. Cl.⁶ .................................................. G09G 3/36
[52] U.S. Cl. .................. 345/90; 345/87; 345/95; 345/6; 348/40; 348/58; 359/11
[58] Field of Search ................ 345/90, 95, 103, 345/6, 87; 348/40, 58; 359/11

[56] References Cited

U.S. PATENT DOCUMENTS

| | | | |
|---|---|---|---|
| 5,497,254 | 3/1996 | Amako et al. | 359/53 |
| 5,572,244 | 11/1996 | Jackson et al. | 349/41 |
| 5,581,378 | 12/1996 | Kulick et al. | 359/9 |
| 5,598,285 | 1/1997 | Kondo et al. | 349/39 |
| 5,623,353 | 4/1997 | Kanemoto et al. | 349/122 |

OTHER PUBLICATIONS

P. St. Hilaire, S. A. Benton, and M. Lucente; "Synthetic Aperture Holography: A Novel Approach the Three–Dimensional Displays"; Nov., 1992; J. Opt. Soc. Am. A., vol. 9, No. 11.

P. F. Brinkley, S. T. Kowel, and Chinghua Chu; "Liquid Crystal Adaptive Lens: Beam Translation and Field Meshing"; Nov., 1988, Applied Optics, vol. 27, No. 21.

G. D. Love, J. V. Major, and A. Purvis; "Liquid–crystal Prisms for Tip–Tilt Adaptive Optics"; Aug. 1, 1994, Opt. Soc. Am, Optics Letters, vol. 19, No. 15.

P. Seary, T. Hahn, L. Wang, G. Moddel, J. Wootton, G. Waldman, and D. Holder; "Wedged Liquid Crystal Beam Splitting Device"; Mar. 14–16, 1995, Opt. Soc. Am. Conference on Spatial Light Modulators and Applications, 1995 Technical Digest Series vol. 9.

Primary Examiner—Dennis-Doon Chow
Assistant Examiner—Amr Awad
Attorney, Agent, or Firm—Jay R. Beyer; Stephen C. Shear

[57] ABSTRACT

A display includes a plurality of individually electrically controllable pixels. Each pixel has a layer of light controlling medium extending over a predetermined area of the pixel. The light controlling medium is responsive to electrical fields directed through the area of the light controlling medium for controlling the light passing through the pixel as a predetermined function of the magnitude of the electric field. Each pixel has an electric field directing arrangement for directing an electric field through the layer of light controlling medium of the pixel. The electric field for each pixel is controllably variable over the area of the light controlling medium of the pixel such that the light passing through the area of the light controlling medium of the pixel is controlled in a manner that varies over the area of the pixel depending on the variable electric field.

14 Claims, 2 Drawing Sheets

DISPLAY HAVING GRADIENT RESPONSE PIXELS

BACKGROUND OF THE INVENTION

The present invention relates generally to displays having a plurality of individually controllable pixels. More specifically, the invention relates to displays having pixels which respond variably over the area of each pixel in response to an applied electrical field directed through each pixel.

Typically the resolution of a display is improved by reducing the size of the pixels and increasing the number of pixels making up the display. Typical high resolution displays have on the order of 1000 rows and 1000 columns of pixels resulting in a total of on the order of 1,000,000 pixels. Also, conventional displays provide gray scale (monochrome or color) by allowing each individual pixel making up the display to be operated at one of a plurality of discrete gray scale levels during any given frame or by time multiplexing binary response pixels to produce time averaged gray scale. As the number of pixels are increased to improve resolution, and as the number of gray scale levels are increased to improve the quality of the image, the amount of data that must be transferred to the display for each given frame is significantly increased requiring more complex controllers and pixel addressing schemes to operated the display.

Most images are made up of gray levels and/or other colors that vary gradually as a function of position. Therefore, to provide a relatively smooth transition, for example from a light gray scale to a dark gray scale, the pixels in the area of the display where the transition is being made are controlled such that each consecutive adjacent pixel has a slightly darker gray scale than the previous pixel. Because of this incremental approach, it takes a large number of pixels (i.e. a high density of pixels) to provide a smooth transition.

3D displays are currently being developed which use coherent, in phase light to illuminate or back light a display. Each pixel of the display modulates the phase of the light passing through that pixel in a controlled way which causes the light passing through that pixel to be out of phase with the light passing through other near by pixels. This approach to providing a 3D display is referred to as phase modulation to produce wave front reconstruction. The differences in the phase of the light passing through the various pixels provides visual queues that cause the image created by the display to appear to be a three dimensional image. This approach to providing a 3D display is described in detail in an article written by P. St. Hilaire, S. A. Benton, and M. Lucente entitled "Synthetic Aperture Holography: A Novel Approach to Three-Dimensional Displays" published in the Journal of the Optical Society of America, A, 9, 1969–1977 (1992), which is incorporated herein by reference.

One of the most challenging aspects of developing 3D wave front reconstructing displays is that the pixels must be sufficiently small for holography. Putting it differently, the pixel pitch must be sufficiently small for the Fresnel diffraction cone to provide the desired field of view or viewing angle. This requires that the spatial extent of each pixel is limited to approximately the wavelength of the light being used by the display divided by the side of the desired viewing angle. This diffraction criterion is well known to those skilled in the art and hence will not be described in more detail herein.

For visible light and a viewing angle of approximately fifteen degrees, the display would require a pixel pitch of approximately 2 $\mu$m irrespective of the overall size of the display. A pixel pitch of 2 $\mu$m is extremely difficult to achieve in a display, and even for a very small display such as a 1 cm$^2$ display, this pixel pitch would result in a display having approximately 5000 rows and 5000 columns of pixels. This extremely high pixel count creates a substantial information transfer problem. As the size of the display is increased, this problem further increases since the pixel pitch cannot be reduced.

The present invention provides a display having individually controllable pixels, each of which responds variably over the area of the pixel. As will be seen, using the present invention in a conventional two dimensional display, this individual controllably variable response of each pixel relaxes the pixel pitch requirement necessary to provide a given resolution for displaying images having varying gray scales in the image. That is, the pixel pitch does not have to be as small as it would have to be in conventional displays to provide the same resolution. In a phase modulating type 3D display as described above, the individual controllably variable response pixels may be used to variably modulate the phase of the light over the area of each pixel. Since the present invention allows the light to be variably phase modulated over the area of each pixel, the phase interference necessary to provide the 3D effect is provided within each pixel. This allows a phase interference type 3D display to be built without being limited to a pixel pitch dictated by the wavelength and the viewing angle as described above.

SUMMARY OF THE INVENTION

As will be described in more detail hereinafter, a display including a plurality of individually electrically controllable pixels is disclosed herein. Each pixel has a layer of light controlling medium extending over a predetermined area of the pixel. The light controlling medium is responsive to electrical fields directed through the area of the light controlling medium for controlling the light passing through the pixel as a predetermined function of the magnitude of the electric field. Each pixel has an electric field directing arrangement for directing an electric field through the layer of light controlling medium of that particular pixel. The electric field for each pixel is controllably variable over the area of the light controlling medium of the pixel such that the light passing through the area of the light controlling medium of the pixel is controlled in a variable manner depending on the variable electric field.

In one embodiment, the light controlling medium is a liquid crystal material capable of modulating the intensity of light passing through the pixel. In another embodiment, the light controlling medium is a liquid crystal material capable of modulating the polarization of the light passing through the pixel. Alternatively, the light controlling medium may be a liquid crystal material capable of modulating the phase of the light passing through the pixel.

In one preferred embodiment, the electric field directing arrangement includes a first layer of transparent conductive material positioned adjacent to the area of light controlling medium. At least two electrodes are electrically connected to the first transparent conductive material at predetermined locations. The field directing arrangement also includes a first voltage applying arrangement for applying and maintaining different voltages at the two electrodes so as to cause a voltage gradient across the area of the first transparent conductive material. A second layer of transparent conductive material is positioned adjacent the side of the area of light controlling medium opposite the first transparent conductive material. At least two electrodes are electrically connected to the second transparent conductive material at predetermined locations. The field directing arrangement further includes a second voltage applying arrangement for applying and maintaining different voltages at the two electrodes so as to cause a voltage gradient across the area of the second transparent conductive material.

BRIEF DESCRIPTION OF THE DRAWINGS

The features of the present invention may best be understood by reference to the following description of the presently preferred embodiments together with the accompanying drawings.

DETAILED DESCRIPTION OF THE PREFERRED EMBODIMENTS

Figure 1:
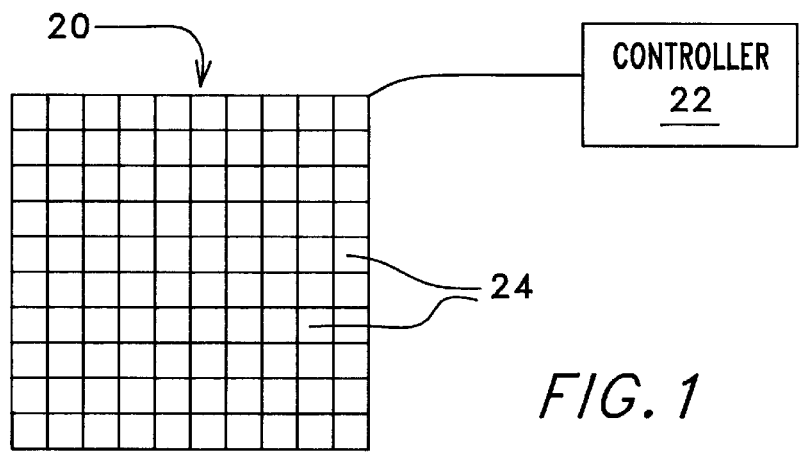
FIG. 1 is a diagrammatic plan view of a display designed in accordance with the present invention.

Referring initially to FIG. 1, a display designed in accordance with the present invention and generally designated by reference numeral 20 will be described. Display 20 is controllably connected to a suitable and readily providable controller 22 for controlling the operation of display 20. Controller 22 may be any controller which is capable of individually controlling each of the individual pixels 24 making up display 20 by switching each of the individual pixels as will be described in more detail hereinafter.

Display 20 may take on a wide variety of specific configurations and still remain within the scope of the invention. For example, display 20 may be either a transmissive display or a reflective type display. The display may take the form of a projector display, a direct view display, or any other desired type of display. It may be monochromatic or color. In the case of a color display, the color may be provided in a field sequential manner in which light of different colors is sequentially directed through the display. Alternatively, the color may be provided in a spatial manner in which each pixel is actually made up of, for example, three pixels with each of the three pixels corresponding to a different color such as red, green, and blue. As will be described in more detail hereinafter, the display may be a two dimensional display or a three dimensional display. The present invention would equally apply to all of these various displays and any other display so long as each pixel making up the display is able to respond variably over the area of the pixel in response to an applied electrical field directed through the pixel.

Figure 2A:
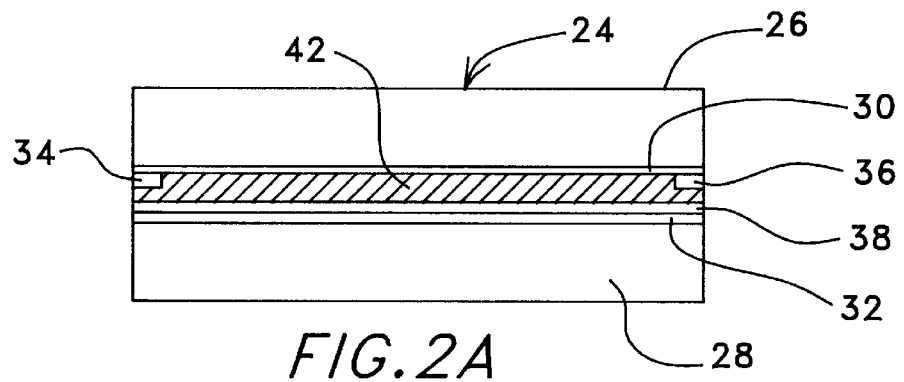
FIG. 2A is a diagrammatic cross-sectional view of one of the pixels of the display shown in FIG. 1.
Figure 2B:
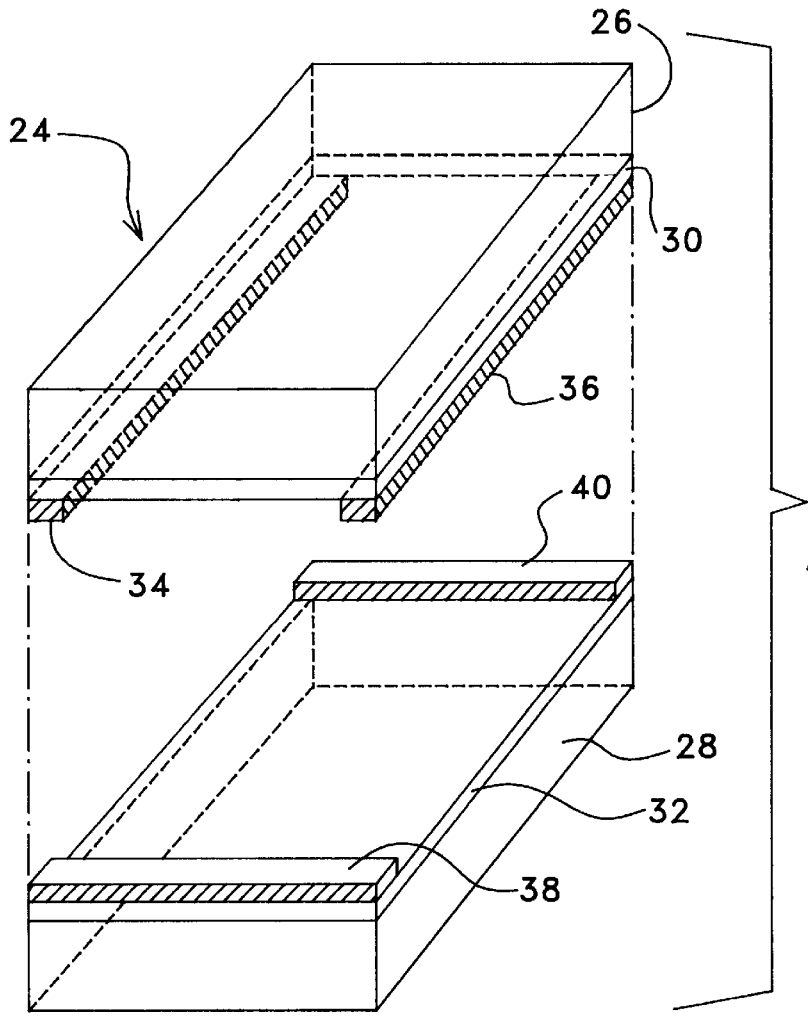
FIG. 2B is a partially exploded diagrammatic perspective view the pixel shown in FIG. 2A.

Referring to FIGS. 2A and 2B, the construction of one preferred embodiment of an individual pixel 24 of overall display 20, designed in accordance with the present invention, will be described. FIG. 2A illustrates a cross-sectional view of pixel 24 and FIG. 2B shows a partially exploded perspective view of pixel 24. In this particular embodiment, display 20 takes the form of a transmissive type display.

As shown in FIGS. 2A and 2B, pixel 24 includes an upper transparent substrate 26 and a lower transparent substrate 28, which are shown exaggerated in thickness for purposes of clarity. Substrates 26 and 28 may be any suitable dielectric transparent material such as, but not limited to, glass, plastic, or various clear crystal materials. In this embodiment, pixel 24 includes two layers of transparent conductive oxide (TCO) material 30 and 32, also shown exaggerated in thickness. TCO layer 30 is supported on the bottom surface of substrate 26 and TCO layer 32 is supported on the top surface of substrate 28. TCO layers 30 and 32 may be any transparent conductive material. One example of such a material is indium tin oxide (ITO).

In accordance with the invention, in this particular embodiment, pixel 24 includes two pairs of electrodes (shown exaggerated in thickness and width) with each pair being associated with one of the TCO layers. As illustrated in FIGS. 2A and 2B, pixel 24 has an X axis which is aligned with the pixel rows of display 20 and a Y axis which is aligned with the pixel columns of display 20. The first pair of electrodes is made up of electrodes 34 and 36 which are attached to TCO layer 30. The second pair of electrodes is made up of electrodes 38 and 40 which are attached to TCO layer 32. In this embodiment, electrodes 34 and 36 are metal electrode traces or strips deposited on TCO layer 30 along opposite edges of TCO layer 30 normal to the pixel's X axis. Electrodes 38 and 40 are metal electrode traces or strips deposited on TCO layer 32 along opposite edges of TCO layer 32 normal to the pixel's Y axis.

Although the electrodes and the TCO layers have been described as being positioned between substrates 26 and 28, this is not a requirement. Instead, these components of the pixel may be supported in a variety of ways and still remain within the scope of the invention so long as they function in the manner to be described. For example, the electrodes and TCO layers may be supported on the outer surfaces of the substrate rather than the inner surfaces of the substrates as described above.

As will be described in more detail hereinafter, when different voltages are applied to and maintained on electrodes 34 and 36, TCO layer 30 exhibits a voltage gradient which varies along the X axis of the pixel over the area of TCO layer 30. This voltage gradient is determined by the different voltages applied to electrodes 34 and 36. Similarly, when different voltages are applied to and maintained on electrodes 38 and 40, TCO layer 32 exhibits a voltage gradient which varies along the Y axis of the pixel over the area of TCO layer 30. When the electrodes are applying and maintaining different voltages to the TCO layers 30 and 32, an electric field is formed between TCO layers 30 and 32. The magnitude of the electric field varies over the area of the pixel between the TCO layers in a way which depends on the voltages applied to the electrodes. This controllably varying electric field is used to variably control the light controlling characteristics of an electrooptic material 42 sandwiched between substrates 30 and 32.

For this embodiment, TCO layers 30 and 32 must be sufficiently resistive such that the current which passes between the electrodes attached to the TCO layers is not so high that it heats up the pixel significantly. The resistance should also be such that the current passing between the electrodes is not so large that the display cannot be efficiently driven by controller 22. Furthermore, the resistivity should be sufficiently low that the RC time constant for charging the pixel is less than the frame time of the display. For example, if the capacitance per unit area of the cell is 1 $nF/cm^2$, and the pixel size is 25 $\mu$m by 25 $\mu$m, the pixel capacitance is approximately $6 \times 10^{-15}$ F. For a sheet resistivity of $10^{10}$ Ω/sq, the RC time constant would be $6 \times 10^{-5}$ sec, which is sufficiently short for display applications. The power dissipated per pixel in the TCO would be $V^2/R$, where V is the applied voltage. For V=10 volts and R=$10^{10}$ Ω, the power dissipated per pixel would be $10^{-8}$ W, corresponding to 1.6 mW/cm$^2$.

Electrooptic material 42 may be a variety of different materials which act on light directed through the material in different ways depending on the electric field applied through the electrooptic material. For example, various liquid crystal materials and their accompanying alignment layers at the surfaces may be used to modulate the intensity, polarization, or phase of the light transmitted through the pixel. These liquid crystal materials include, but are not limited to nematic liquid crystals, ferroelectric liquid crystals, and electroclinic liquid crystals. Each of these types of liquid crystal materials may alternatively be provided as a guest host liquid crystal. Other thin film electrooptic materials such as organic polymer films and solid ferroelectric thin films may also be utilized. These various technologies and associated materials are known to those skilled in the art and the use of these various materials to provide a gradient response pixel will be clear to those skilled in the art in view of this disclosure. The present invention would equally apply regardless of the specific electrooptic material utilized within the pixel so long as each pixel making up the display is able to respond variably over the area of the pixel in response to an applied electrical field directed through the pixel Using the above described pixel 24, the electrooptic material responds to the voltages applied to and maintained on the electrodes in a way which controllably depends upon the different voltages applied to and maintained on electrodes 34, 36, 38, and 40. In the embodiment illustrated in FIGS. 2A and 2B, electrodes 34 and 36 along with TCO layer 30 are used to form a voltage gradient over the area of TCO layer 30 that varies along the X axis of the pixel. Electrodes 38 and 40, along with TCO layer 32, are used to form a voltage gradient over the area of TCO layer 32 that varies along the Y axis of the pixel. The combination of the gradient voltage on TCO layers 30 and 32 form an electric field through electrooptic material 42 which controllably varies over the area of the pixel and therefore controllably varies the light controlling characteristics of the electrooptic material over the area of the pixel.

The above described configuration allows the light controlling characteristics of the pixel to be controllably varied over the entire area of the pixel. In the case in which an electrooptic material is used that controls the intensity or the polarization of light passing through the pixel, this arrangement allows the pixel to be controlled such that the gray scale of the pixel varies over the area of the pixel. In the case in which an electrooptic material is used that phase modulates the light passing through the pixel, this arrangement allows the pixel to be controlled such that the phase modulation of the light passing through the pixel varies over the area of the pixel.

This ability to controllably vary the response of the pixel over the area of the pixel provides several unique capabilities compared to conventional displays. In the case of a two dimensional display in which the electrooptic material modulates the intensity or the polarization of light passing through the pixel, each pixel is able to display a gray scale level that varies over the area of the display. This allows a display designed in accordance with the invention to display images with continuously varying gray scales over the area of the image with greater resolution than a conventional display having the same pixel pitch. For most images, the inventive display is able to provide an image comparable in resolution to conventional displays using a display having a substantially reduced pixel pitch compared to the conventional display.

In the case of phase modulating three dimensional displays such as those described in the background, the ability to controllably vary the response of the pixel over the area of the pixel allows the pixels of a three dimensional display to be constructed without being restricted to very small pixels dictated by the wavelength of light and the desired viewing angle as described above in the background. In this case, the electrooptic material is a phase modulating material. Since the response of each pixel can be varied over the area of the pixel, light passing though any given portion of the pixel may be phase modulated differently than the light passing through other portions of the pixel. This can also be viewed as a piecewise linear approximation of a spatially varying phase front. This effectively allows the pixel to act as a continuously variable phase modulating pixel over the area of the pixel and therefore eliminates the size restriction described in the background.

Now that the configuration of one embodiment of a pixel designed in accordance with the invention has been described, an electrical circuit capable of controlling the pixel described above will be described. Since TCO layer 30 and its associated electrodes 34 and 36 have substantially the same configuration as TCO layer 32 and its associated electrodes 38 and 40, the circuit for controlling layer 30 and its associated electrodes would be similar to the circuit for controlling layer 32 and its associated electrodes. Therefore, only the circuit for controlling layer 30 along with electrodes 34 and 36 will be described in detail. It is to be understood that electrodes 38 and 40, along with their associated TCO layer 32, would be controlled in a similar manner. It is also to be understood that it is the combination of the gradient voltages formed on TCO layers 30 and 32 that form the varying electric field that acts on electrooptic material 42 as described above.

Figure 3:
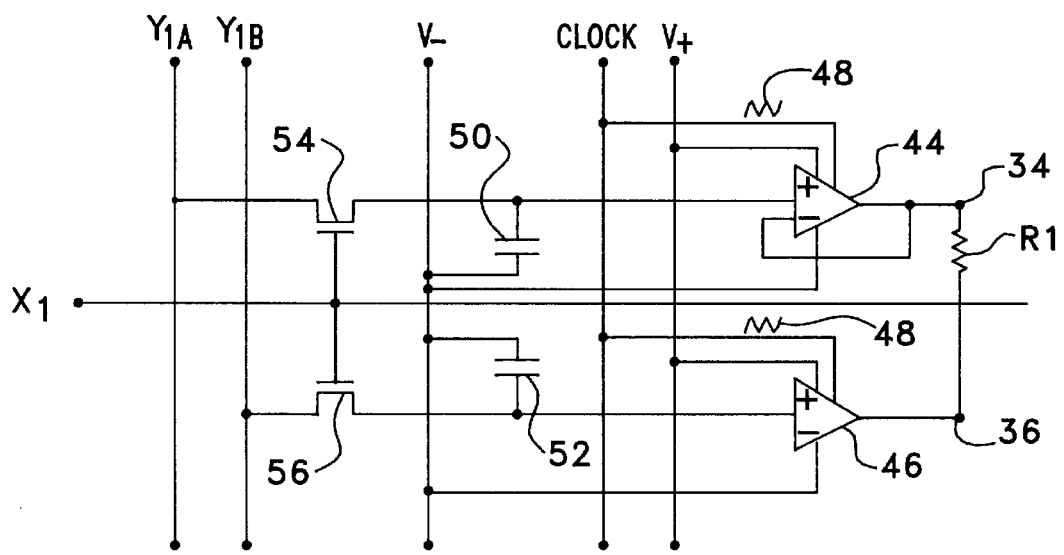
FIG. 3 is a schematic drawing of one embodiment of circuitry capable of controlling a portion of one of the pixels of a display designed in accordance with the present invention.

FIG. 3 illustrates a schematic diagram of one embodiment of a circuit for controlling TCO layer 30 and its associated electrodes 34 and 36. TCO 30 is represented in this schematic by resistance R1 located between electrode 34 and electrode 36. The pixel is selected using row line $X_1$. However, instead of having only one column line associated with the pixel as would be the case for a conventional display pixel, two column lines $Y_{1A}$ and $Y_{1B}$ are used to control electrodes 34 and 36 respectively. As mentioned above, a similar arrangement would be used to control electrodes 38 and 40 on the other side of electrooptic material 42 of pixel 24. Therefore, a total of four column lines would be used to control each pixel for the above described embodiment.

Still referring to FIG. 3, electrode 34 and electrode 36 are connected to the output of amplifiers 44 and 46 respectively. In the case where the electrooptic material is a material in which AC power is used to control the electrooptic material, a strobe signal (indicated by signal 48) is provided to amplifiers 44 and 46. This strobe signal is used by amplifiers 44 and 46 to produce an AC output to electrodes 34 and 36. Also, power is provided to amplifiers 44 and 46 as indicated by $V_-$ and $V_+$ in FIG. 3. Capacitors 50 and 52 are respectively electrically connected to the inputs of amplifiers 44 and 46. And finally, a transistor 54, controlled by row line $X_1$, switchably connects column line $Y_{1A}$ to capacitor 50. Similarly, a transistor 56, also controlled by row line $X_1$, switchably connects column line $Y_{1B}$ to capacitor 52. Using this circuit, when row line $X_1$ is selected, transistors 54 and 56 are switched such that capacitors 50 and 52 hold the voltage provided by column lines $Y_{1A}$ and $Y_{1B}$ respectively. Amplifiers 44 and 46, using the voltage held by capacitors 50 and 52, respectively, as their inputs, maintain the applied voltages provided by $Y_{1A}$ and $Y_{1B}$ at electrodes 34 and 36 respectively using the power supplied by $V_-$ and $V_+$.

Although only one specific circuit for controlling the gradient response pixel of the present invention has been described, it is to be understood that the pixel may be controlled in a wide variety of ways and still remain within the scope of the invention. In fact, any arrangement which causes the pixel to have a response that varies over the area of the pixel would equally fall within the scope of the invention. Also, although the pixel has been described as having a pair of electrodes to vary the voltage over each of the TCO layers on each side of the electrooptic material, this is not a requirement. Alternatively, the TCO layer on one side of the electrooptic material may be held at a constant voltage while only the TCO layer on the other side is arranged to have a gradient voltage over the area of the TCO layer. Furthermore, although the electrodes have been described as being positioned along opposite edges of the TCO layer with one TCO layer controlling the X axis gradient and the other TCO layer controlling the Y axis gradient, it should be understood that they may be positioned in a wide variety of specific locations on either of the TCO layers. For example, four electrodes may be positioned at the corners of only one of the TCO layers. Also, although the pixels have been described as including TCO layers to interconnect the associated electrodes, the display may alternatively be provided without TCO layers. If this is the case, the electric field through the electrooptic material would be created by the relative positioning of the electrodes themselves. All of these variations would equally fall within the scope of the invention.

Figure 4:
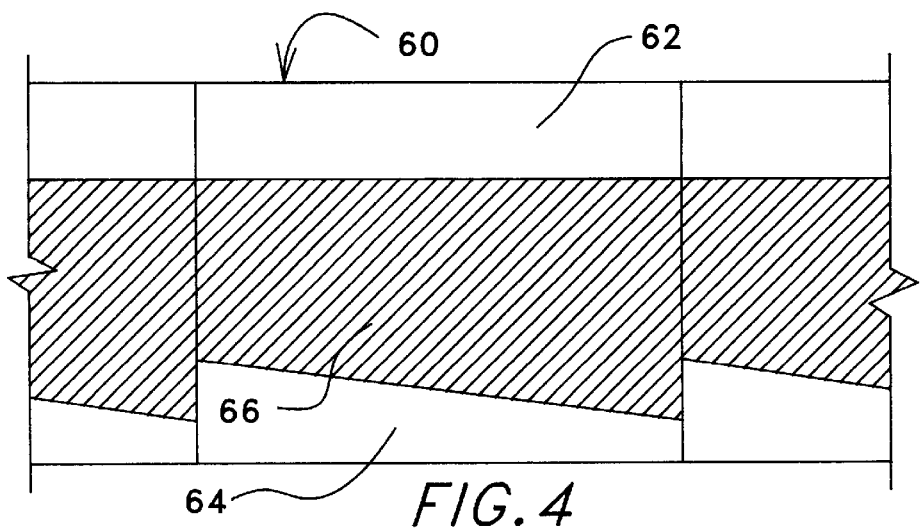
FIG. 4 is a diagrammatic cross-sectional view of a second embodiment of one pixel of an over all display having a plurality of individually controllable pixels designed in accordance with the invention.

Although the electrooptic material has been illustrated as having a constant thickness over the area of the pixel, this is not a requirement. As is known in the art, various electrooptic materials respond differently to a given electric field depending on the thickness of the material. Therefore, a display having pixels including a layer of electrooptic material which varies in thickness over the area of the pixel may also be used to provide a display having gradient response pixels which have a varying response over the area of the pixel. FIG. 4 illustrates a cross-sectional view of one pixel 60, which is part of an overall display designed in accordance with the invention, and which uses this thickness varying approach to providing a gradient response pixel. As shown in FIG. 4, pixel 60 includes transparent substrates 62 and 64 which sandwich a layer of electrooptic material 66 between substrates 62 and 64. Pixel 60 would also include TCO layers on each side of the electrooptic material (not shown). The TCO layer may have multiple electrodes associated with the layer to be capable of causing the layer to exhibit a voltage gradient as described above. Alternatively, the TCO layers may be held at a constant voltage in which case only the varying thickness of the electrooptic material over the area of the pixel would be relied upon to create the varying response of the pixel.

Although the thickness varying approach may not be as practical to actually produce and does not provide the flexibility or controllability described above for the voltage controlled approach, this approach still would fall within the scope of the invention. Also, it should be understood that the invention equally applies to any combination of the two approaches. Furthermore, in the case of a 3D display which uses a phase modulating light controlling medium, each pixel may include a phase retarding wedge associated with each pixel which varies the phase along, for example, the X axis of the pixel. In this case, the phase retarding wedge would cause the light passing through the pixel to vary along the X axis of the area of the pixel. This may be used in combination with the approach of varying the electric field through the pixel, for example along the Y axis, to provide a display with controllably variable response pixels.

Although the display has been generally described as an active matrix display in which the pixels are activated row by row using a matrix of row and column lines, this is not a requirement. Alternatively, the display may be controlled in any manner so long as each of the pixels is individually controllable such that each pixel has a gradient responds that varies over the area of the pixel. For example, the display may be a direct drive display in which each pixel is directly controlled. Also, although the display has been described as using an electrooptic material and an electric field to control the light passing through the pixel, other materials such as optically controlled materials may alternatively be used.

Although the above described embodiments have been describe with the various components having particular respective orientations, it should be understood that the present invention may take on a wide variety of specific configurations with the various components being located in a wide variety of positions and mutual orientations and still remain within the scope of the present invention. For example, although the pixels have been illustrated as being generally square in shape, this is not a requirement. Instead, the pixels may have an area of any desired shape and still remain within the scope of the invention. Therefore, the present examples are to be considered as illustrative and not restrictive, and the invention is not to be limited to the details given herein, but may be modified within the scope of the appended claims.

What is claimed is:

1. A three dimensional display comprising a plurality of individually controllable pixels, each pixel including a layer of light controlling medium extending over a predetermined area of each pixel, the light controlling medium being capable of individually modulating the phase of the light passing through each pixel, the light controlling medium being responsive to control signals directed through the area of the light controlling medium of each pixel in order to control the response of the light controlling medium of each pixel such that the response of the light controlling medium controls the phase of the light passing through each pixel as a predetermined function of the control signals, each pixel further including control signal directing means for directing control signals through the area of the light controlling medium such that the phase of the light passing through the area of the light controlling medium of each pixel is controlled in a manner which is variable over the area of each pixel, the variation of the phase of the light passing through the area of the light modulating medium of each pixel causing controlled phase interference in the light from pixel to pixel over the area of the display that results in a pattern of phase interference thereby providing a three dimensional display.

2. A display according to claim 1 wherein the control signals are electrical fields directed through the area of the light controlling medium for controlling the light passing through each pixel as a predetermined function of the magnitude of the electric field and wherein the control signal directing means for each pixel are electric field directing means for directing an electric field through the layer of light controlling medium of that pixel such that the light passing through the area of the light controlling medium of that pixel is controlled in a variable manner over the area of that pixel depending on the electric field.

3. A display according to claim 2 wherein the light controlling medium is a liquid crystal material capable of modulating the phase of the light passing through each pixel.

4. A display according to claim 2 wherein the electric field for each pixel is controllably variable over the area of the light controlling medium of each pixel such that the light passing through the area of the light controlling medium of each pixel is controlled in a variable manner depending on the variable electric field.

5. A display according to claim 4 where in the electric field directing means of each pixel includes:
   a) a first layer of transparent conductive material positioned adjacent the area of light controlling medium,
   b) at least two electrodes electrically connected to the first transparent conductive material at predetermined locations, and
   c) means for applying and maintaining different voltages at the two electrodes so as to cause a voltage gradient across the area of the first transparent conductive material.

6. A display according to claim 5 wherein the electric field directing means of each pixel further includes:
   a) a second layer of transparent conductive material positioned adjacent the side of the area of light controlling medium opposite the first transparent conductive material,
   b) at least two electrodes electrically connected to the second transparent conductive material at predetermined locations, and
   c) means for applying and maintaining different voltages at the two electrodes so as to cause a voltage gradient across the area of the second transparent conductive material.

7. A display according to claim 2 wherein the thickness of the light controlling medium for each pixel making up the display is varied in a predetermined way over the area of each pixel such that the light passing through the area of each pixel is controlled in a variable manner depending on the varying thickness of the light controlling medium.

8. A method of providing a three dimensional display, the display having a plurality of individually controllable pixels, each pixel including a layer of light controlling medium extending over a predetermined area of each pixel, the light controlling medium being capable of individually modulating the phase of the light passing through each pixel, the light controlling medium being responsive to control signals directed through the area of the light controlling medium in order to control the response of the light controlling medium such that the response of the light controlling medium controls the phase of the light passing through each pixel as a predetermined function of the control signals, the method comprising the step of:

directing control signals through the layer of light controlling medium of each pixel such that the phase of the light passing through the area of the light controlling medium of each pixel is controlled in a manner which is variable over the area of each pixel, the variation of the phase of the light passing through the area of the light modulating medium of each pixel causing controlled phase interference in the light from pixel to pixel over the area of the display that results in a pattern of phase interference thereby providing a three dimensional display.

9. A method according to claim 8 wherein the control signals are electric fields and the step of directing the control signals includes the step of directing an electric field through the area of the light controlling medium of each pixel.

10. A method according to claim 9 wherein the light controlling medium is a liquid crystal material capable of modulating the phase of the light passing through each pixel.

11. A method according to claim 9 wherein the step of directing the electric fields includes the step of directing an electric field through each pixel that is controllably variable over the area of the light controlling medium of each pixel such that the light passing through the area of the light controlling medium of each pixel is controlled in a variable manner depending on the variable electric field.

12. A method according to claim 11 wherein the step of directing the electric fields further includes the steps of, for each pixel:
   a) providing a first layer of transparent conductive material positioned adjacent the area of light controlling medium,
   b) electrically connecting at least two electrodes to the first transparent conductive material at predetermined locations, and
   c) applying and maintaining different voltages at the two electrodes so as to cause a voltage gradient across the area of the first transparent conductive material.

13. A method according to claim 12 wherein the step of directing the electric fields further includes the steps of, for each pixel:
   a) providing a second layer of transparent conductive material positioned adjacent the side of the area of light controlling medium opposite the first transparent conductive material,
   b) electrically connecting at least two electrodes to the second transparent conductive material at predetermined locations, and
   c) applying and maintaining different voltages at the two electrodes so as to cause a voltage gradient across the area of the second transparent conductive material.

14. A method according to claim 9 wherein the thickness of the light controlling medium for each pixel making up the display is varied in a predetermined way over the area of each pixel such that the light passing through the area of each pixel is controlled in a variable manner depending on the varying thickness of the light controlling medium.

* * * * *